US011830519B2

(12) United States Patent
Gevrekci et al.

(10) Patent No.: US 11,830,519 B2
(45) Date of Patent: Nov. 28, 2023

(54) MULTI-CHANNEL ACOUSTIC EVENT DETECTION AND CLASSIFICATION METHOD

(71) Applicant: ASELSAN ELEKTRONIK SANAYI VE TICARET ANONIM SIRKETI, Ankara (TR)

(72) Inventors: Lutfi Murat Gevrekci, Ankara (TR); Mehmet Umut Demircin, Ankara (TR); Muhammet Emre Sahinoglu, Ankara (TR)

(73) Assignee: ASELSAN ELEKTRONIK SANAYI VE TICARET ANONIM SIRKETI, Ankara (TR)

( * ) Notice: Subject to any disclaimer, the term of this patent is extended or adjusted under 35 U.S.C. 154(b) by 183 days.

(21) Appl. No.: 17/630,921

(22) PCT Filed: Jul. 30, 2019

(86) PCT No.: PCT/TR2019/050635
§ 371 (c)(1),
(2) Date: Jan. 28, 2022

(87) PCT Pub. No.: WO2021/021038
PCT Pub. Date: Feb. 4, 2021

(65) Prior Publication Data
US 2022/0270633 A1 Aug. 25, 2022

(51) Int. Cl.
*H04R 5/00* (2006.01)
*H04H 20/47* (2008.01)
(Continued)

(52) U.S. Cl.
CPC .............. *G10L 25/51* (2013.01); *G10L 25/18* (2013.01); *G10L 25/21* (2013.01); *G10L 25/30* (2013.01); *H04S 3/008* (2013.01); *H04S 2400/01* (2013.01)

(58) Field of Classification Search
CPC ......... G10L 25/51; G10L 25/18; G10L 25/21; G10L 25/30; H04S 3/008; H04S 2400/01
(Continued)

(56) References Cited

U.S. PATENT DOCUMENTS 4,686,655 A * 8/1987 Hyatt .................. G02F 1/13318 708/3
10,311,129 B1 6/2019 Patton et al.
(Continued)

FOREIGN PATENT DOCUMENTS

CN 107004409 A 8/2017
KR 20180122171 A 11/2018
(Continued)

OTHER PUBLICATIONS

Phuong Pham, et al., Eventness: Object Detection on Spectrograms for Temporal Localization of Audio Events, Arxiv, 2017.
(Continued)

*Primary Examiner* — William J Deane, Jr.
(74) *Attorney, Agent, or Firm* — Bayramoglu Law Offices LLC

(57) ABSTRACT

A method for a multi-channel acoustic event detection and classification for weak signals, operates at two stages; a first stage detects a power and probability of events within a single channel, accumulated events in the single channel triggers a second stage, wherein the second stage is a power-probability image generation and classification using tokens of neighbouring channels.

4 Claims, 8 Drawing Sheets

(51) Int. Cl.

| | |
|---|---|
| ***G10L 25/51*** | (2013.01) |
| ***G10L 25/18*** | (2013.01) |
| ***G10L 25/21*** | (2013.01) |
| ***G10L 25/30*** | (2013.01) |
| ***H04S 3/00*** | (2006.01) |

(58) Field of Classification Search

USPC .......................................................... 381/1, 2

See application file for complete search history.

(56) References Cited

U.S. PATENT DOCUMENTS 10,871,548 B2 * 12/2020 Volgyesi ............... G01S 5/0036
2003/0072456 A1 * 4/2003 Graumann ................ G01S 5/22
381/66
2012/0300587 A1 * 11/2012 Azimi-Sadjadi .......... G01S 5/30
367/127
2017/0328983 A1 * 11/2017 Volgyesi ................... G01S 5/28

FOREIGN PATENT DOCUMENTS

RU 2017103938 A3 8/2018
WO 2016155047 A1 10/2016

OTHER PUBLICATIONS

Ian McLoughlin, et al., Time-Frequency Feature Fusion for Noise Robust Audio Event Classification, Circuits, Systems, and Signal Processing, 2020, pp. 1672-1687, vol. 39.

Sharath Adavanne, et al., Multichannel Sound Event Detection Using 3D Convolutional Neural Networks for Learning Inter-channel Features, 2018 International Joint Conference on Neural Networks (IJCNN), 2018, IEEE.

* cited by examiner

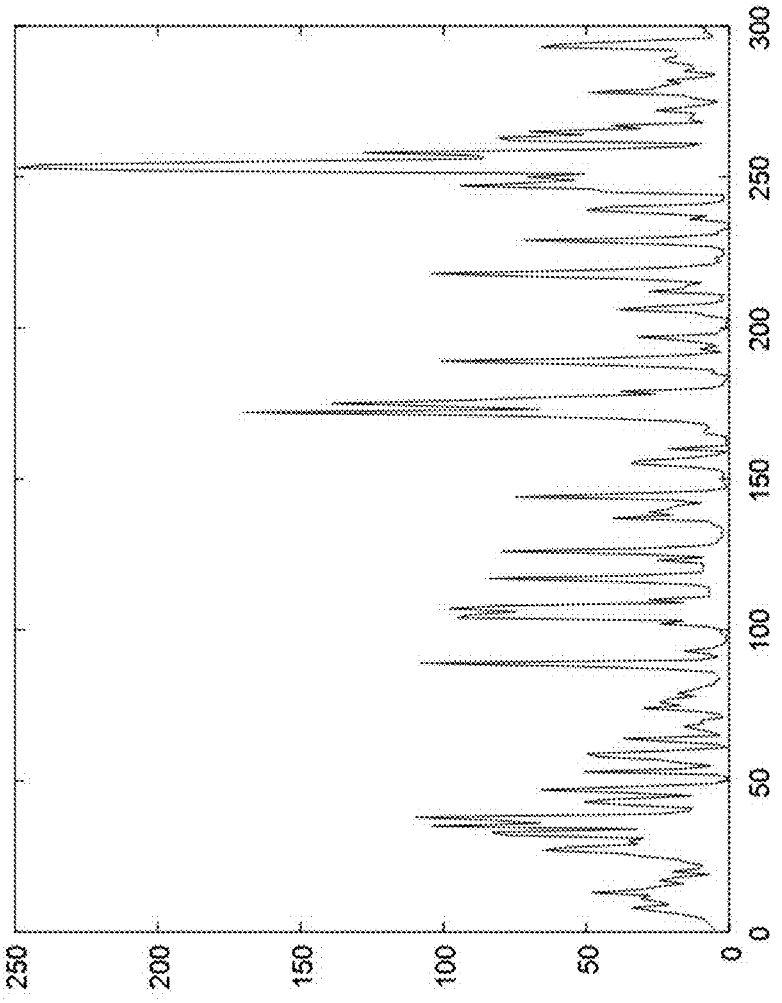
FIG. 6
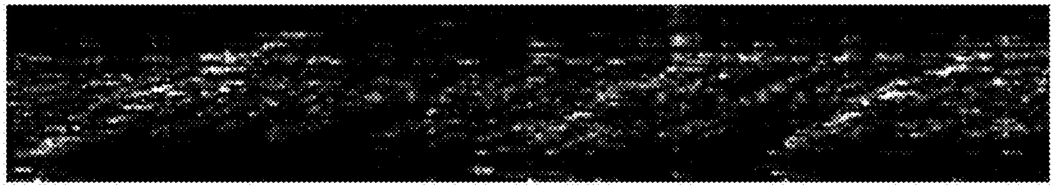

MULTI-CHANNEL ACOUSTIC EVENT DETECTION AND CLASSIFICATION METHOD

CROSS REFERENCE TO THE RELATED APPLICATIONS

This application is the national stage entry of International Application No. PCT/TR2019/050635, filed on Jul. 30, 2019, the entire contents of which are incorporated herein by reference.

TECHNICAL FIELD

The present disclosure relates to a multi-channel acoustic event detection and classification method for weak signals, operates at two stages; first stage detects events power and probability within a single channel, accumulated events in single channel triggers second stage, which is power-probability image generation and classification using the tokens of neighbouring channels.

BACKGROUND

Existing acoustic event detection systems use a voice activity detection (VAD) module to filter out noise. Binary nature of VAD module might cause either weak acoustic events get eliminated, and missing events or declaring too many alarms with lower thresholds. The application numbered CN107004409A offers a running range normalization method includes computing running estimates of the range of values of features useful for voice activity detection (VAD) and normalizing the features by mapping them to a desired range. This method only proposes voice activity detection (VAD), not multiple channel acoustic event detection/classification. Russian patent numbered RU2017103938A3 is related with a method and device that uses two feature sets for detecting only voice region without classification.

Binary event detection hampers the performance of the eventual system. Current state of the art is also not capable of detecting and classifying acoustic events using both power and signal characteristics considering the context of neighbouring channels/microphones. Classifying events using a single microphone ignores the content of the environment, hence is susceptible to more number of false alarms.

The application numbered KR1020180122171A teaches a sound event detection method using deep neural network (ladder network). In this method, acoustic features are extracted and classified with deep learning but multi-channel cases are not handled. A method of recognizing sound event in auditory scene having low signal-to-noise ratio is proposed in application no. WO2016155047A1. Its classification framework is random forest and a solution for multi-channel event detection is not referred in this application.

The article titled "Eventness: Object Detection on Spectrograms for Temporal Localization of Audio Events" discloses the concept of eventness for audio event detection, which can be thought of as an analogue to objectness from computer vision by utilizing a vision inspired CNN. Audio signals are first converted into spectrograms and a linear intensity mapping is used to separate the spectrogram into 3 distinct channels. A pre-trained vision based CNN is then used to extract feature maps from the spectrograms, which are then fed into the Faster R-CNN. This article focuses on single-channel data processing. There is no information that the events are localized spatially because of multi-channel signals and The article has neither multi-channel processing nor sensor fusion.

McLoughlin Ian et al. "Time-Frequency Feature Fusion for Noise Robust Audio Event Classification" offers a system that works on single channel data. For this purpose, a data combining two different features in the time-frequency space was used. There is no such thing as dealing with a large number of scenarios that can be experienced from a positional point of view. It aims to achieve a better performance against the use of a single feature by combining two different time-frequency features.

The U.S. Pat. No. 10,311,129B1 extends to methods, systems, and computer program products for detecting events from features derived from multiple signals, wherein a Hidden Markov Model (HMM) is used. Related patent does not form a power probability image to detect low SNR events.

SUMMARY

The present invention offers a two level acoustic event detection framework. It merges power and probability and forms an image, which is not proposed in existing methods. Presented method analyses events for each channel independently at first level. There is a voting scheme for each channel independently. Promising locations are examined on power-probability image, where each pixel is an acoustic-pixel of a discretized acoustic continuous signal. Most innovative aspect of this invention is to convert small segment acoustic signals into phonemes (acoustic pixel), then understand the ongoing activity for several channels in power-probability image.

Proposed solution generates power and probability tokens from short durations of signal from each microphone within the array. Then power-probability tokens are concatenated into an image for multiple microphones located with aperture. This approach enables summarizing the context information in an image. Power-probability image is classified using machine learning techniques to detect and classify for certain events which is corresponding a target activity or phoneme that needed to be detected and classified, Such methodology enables the system as either keyword-spotting system (KWS) or an anomaly detector.

Proposed system operates at two stages. First stage detects events power and probability within a single channel. Accumulated events in single channel triggers second stage, which is power-probability image generation and classification using the tokens of neighbouring channels. This image is classified using machine learning to find certain type of events or anomalies. Proposed system also enables visualizing the event probability and power as an image and spot the anomaly activities within clutter.

BRIEF DESCRIPTION OF THE DRAWINGS

FIGS. 5, 6 and 7 show sample power-probability images for digging.

DETAILED DESCRIPTION OF THE EMBODIMENTS

Examining the power and probability of a channel independently creates false alarms. Most common false alarm source is the highway regions, which manifest itself as a digging activity due to bumps or microphones being close to the road. Considering several channels together enable the system adopting to the contextual changes such as vehicle passing by. This way system learns abnormal paint-strokes in power-probability image.

Figure 1:
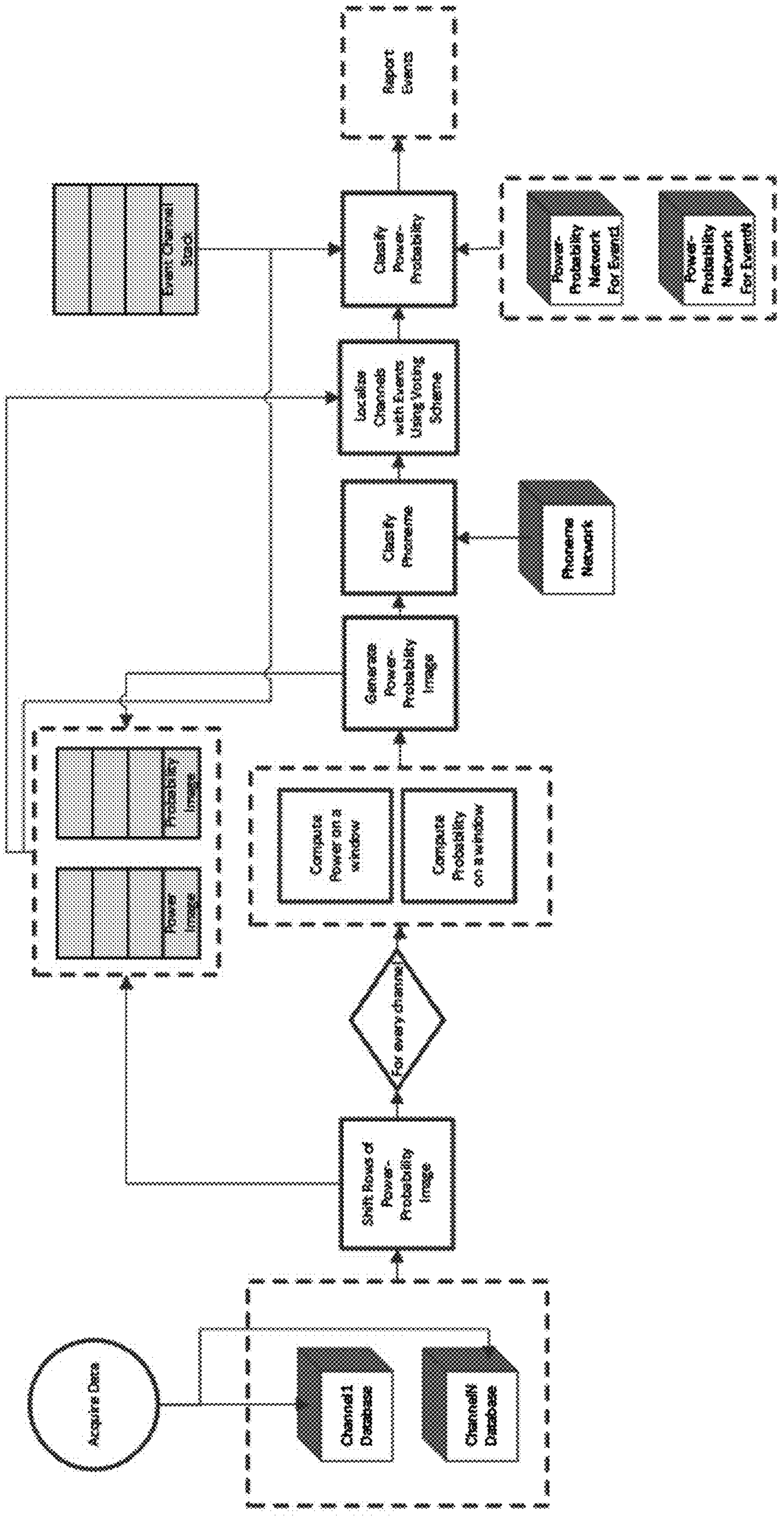
FIG. 1 shows a block diagram of the invention.

As given in FIG. 1, the present invention evaluates the events in each channel independently using a lightweight phoneme classifier independently for each channel. Channels with certain number of events are further analysed by a context based power-probability classifier that utilizes several neighbouring channels/microphones around the putative event. This approach enables real-time operation and reduces the false alarm drastically.

Proposed system uses three memory units:

Channel database: Raw acoustic signals received from a multi-channel acoustic device in a synchronized fashion.

Power-Probability image: Stores the power and probability token of each channel computed for a window. Image height defines the largest possible time duration an event can span, while image width indicates the number of channels/microphones. This image is shifted row-wise, while fresh powers and probabilities are inserted at the first row every time. This image contains the power, probability and cross product of these two features.

Event-channel stack: Stores the indices of channels, whose individual voting exceeds a threshold and indicates a possible event.

Proposed system uses two networks trained offline:

Phoneme classifier: Network classifies acoustic features such as spectrograms using short time windows for a single channel.

Power-probability classifier: Network that classifies events using multi-channel power, probability and its cross product.

Online flowchart of the system is as following:

A time window is specified that can summarize smallest acoustic event.

Power is computed for the specified window size.

- Power is normalized using ratio of low-frequency components to high-frequency components.
- Power is clipped from top and bottom ([−30, 20] dB), and quantized to power quantization level number (20) in between.
- Quantized power is stored in power-probability image.

Classification probability of the signal for time window is computed using machine learning.

- Convolutional neural networks (CNN) are utilized for this purpose, while other machine learning techniques can also be used instead.
- Computed classification probability is stored in the power-probability image for the event of interest. Notice that there is a different power-probability image for every event to be declared, such as walking, digging, excavation, vehicle.

Cross product of power and probability is computed and stored as a third dimension of the image, to enrich the information capacity of the system.

High-probability events which exceed a given threshold are counted for every channel independently from the power-probability image using probability information only. This voting scheme allows to detect possible channels with events. Every channels' probabilities are treated as a queue, such that old events are popped out of the queue using a time-to-live. Channels which have a certain number of events with high probability are recorded to the Event Channel Stack.

For every event in Event Channel Stack

- For every event of interest determined by user
  - Crop region of interest around the channel. Channel width (12) generates an image with width of 25. For a sampling rate of 5 Hz, and time span of 60 seconds, power probability image becomes 25×300.
  - Convolutional neural network (CNN) trained for certain action is applied to the image for that channel region.
  - Event is reported in case the power-probability classifier generates result exceeds threshold for the event.

Figure 2:
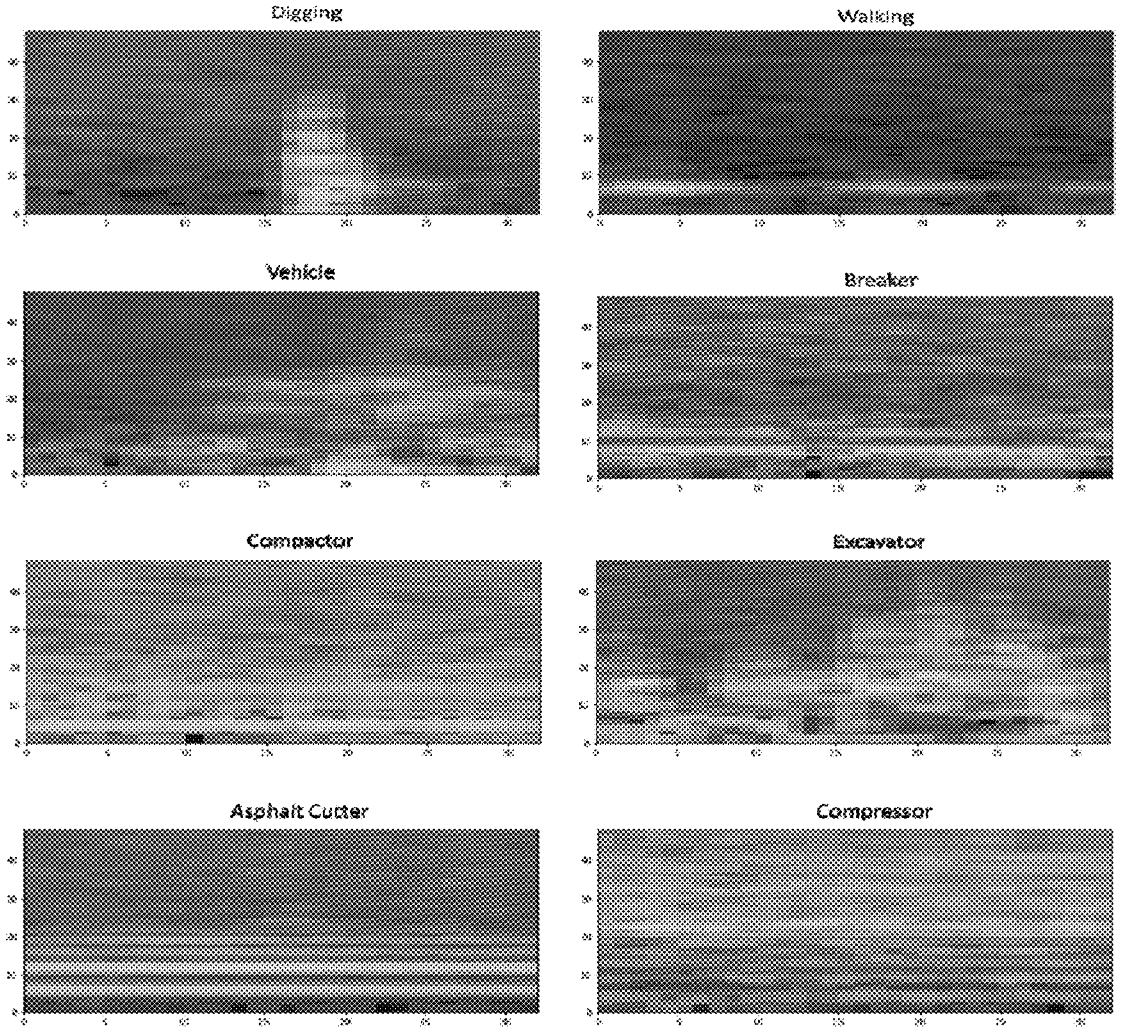
FIG. 2 shows spectrogram of a variety of events.
Figure 3:
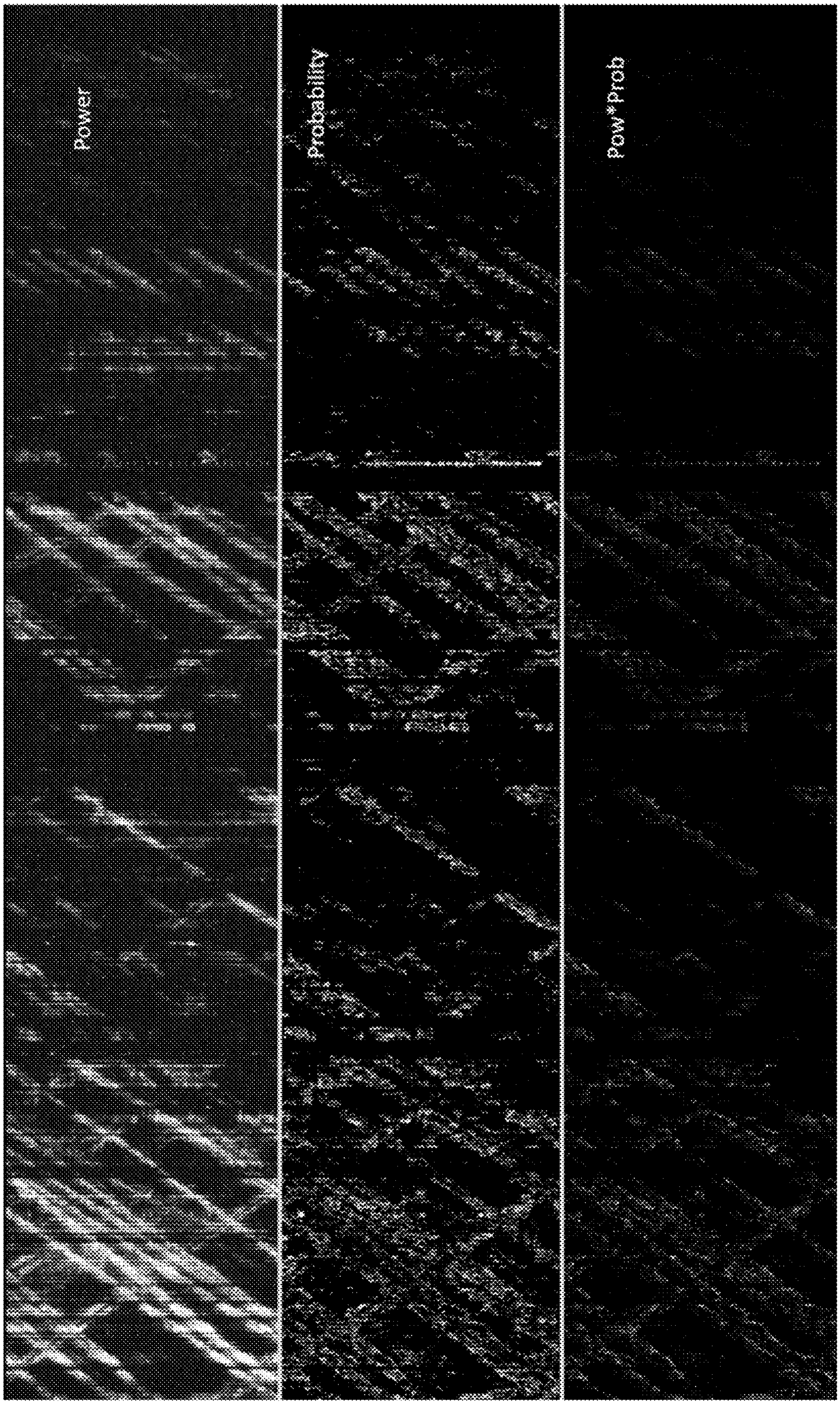
FIG. 3 shows a sample power-probability image.
Figure 4:
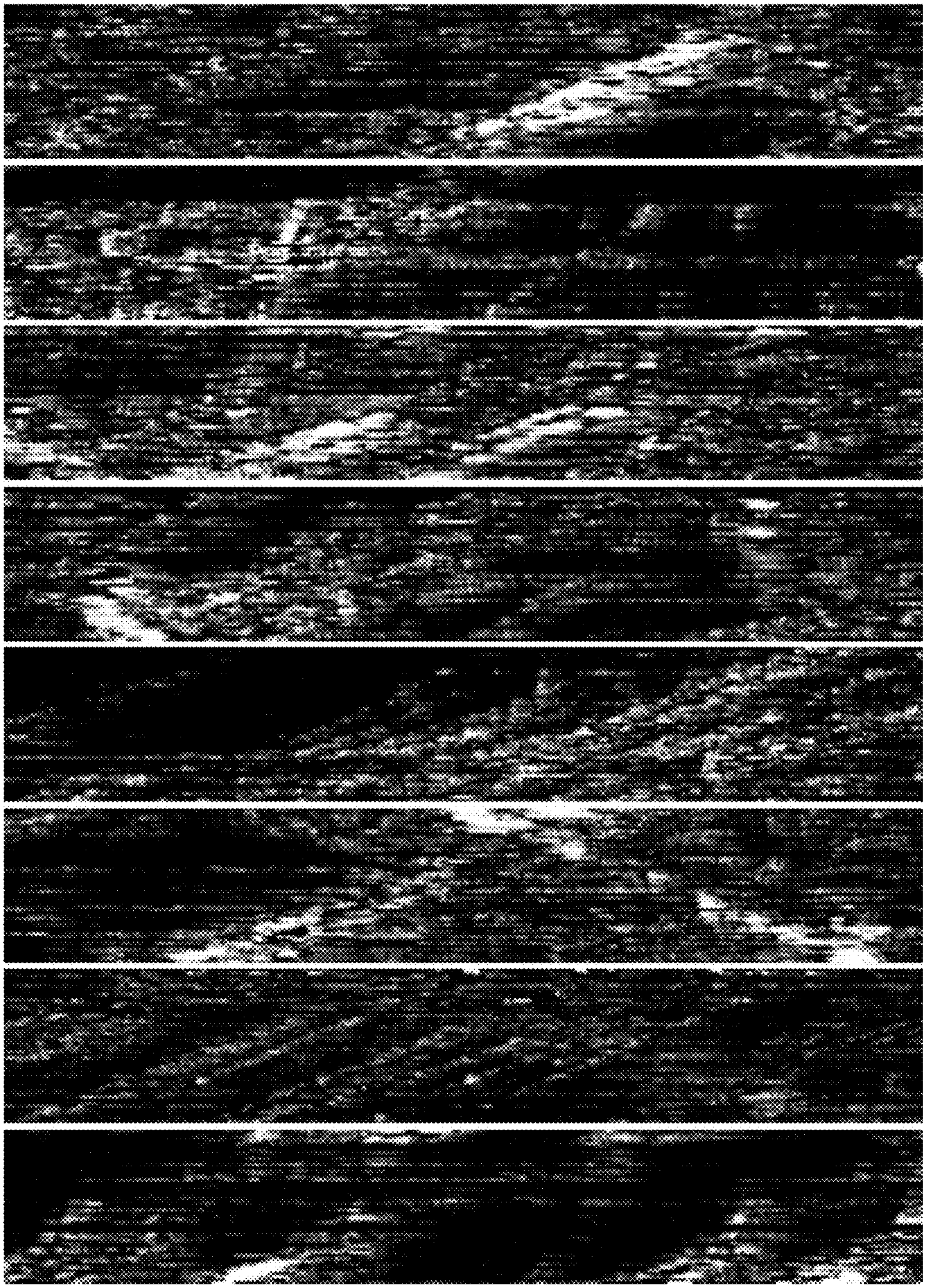
FIG. 4 shows noise background sample images.
Figure 5:
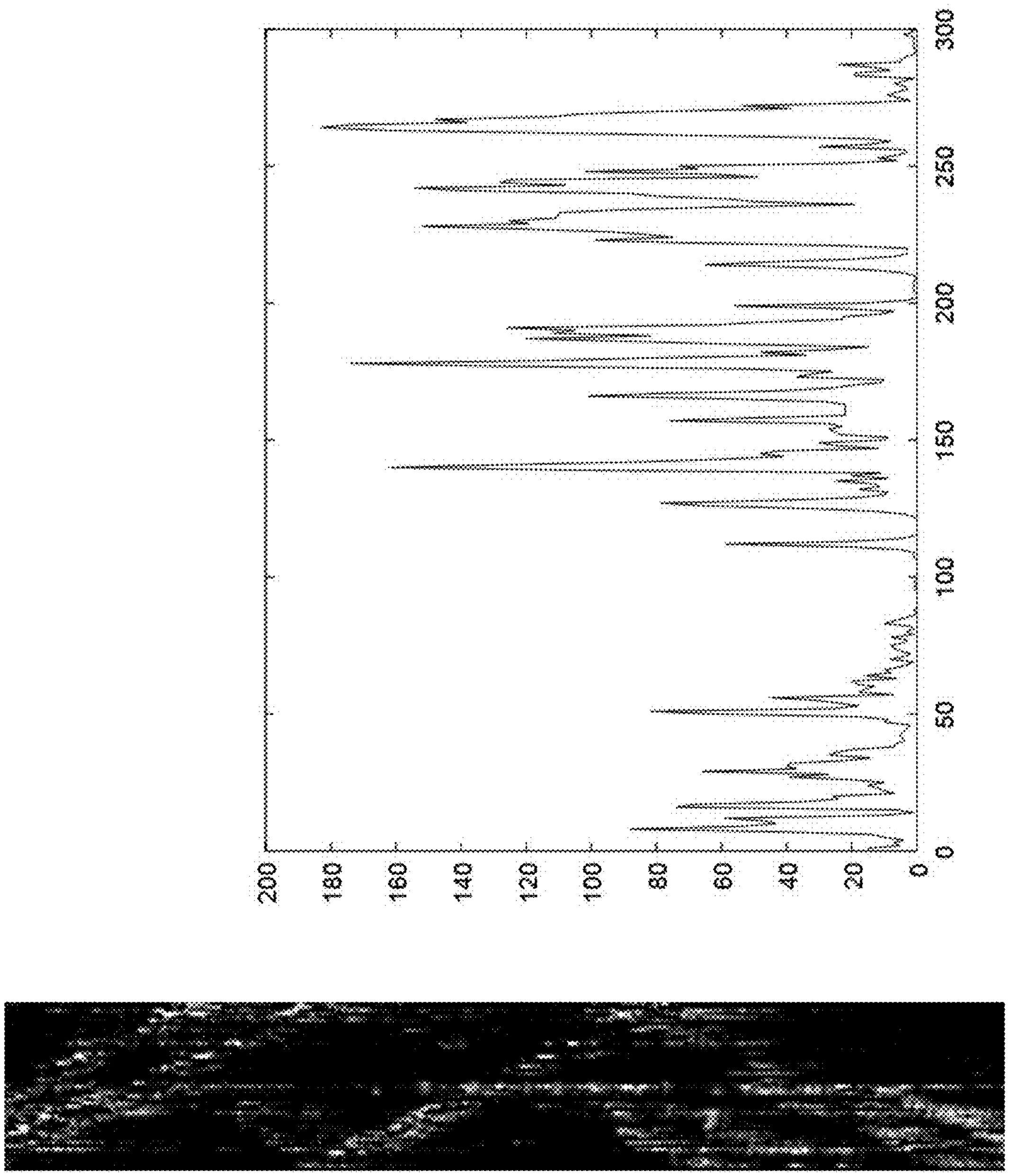
Figure 7:
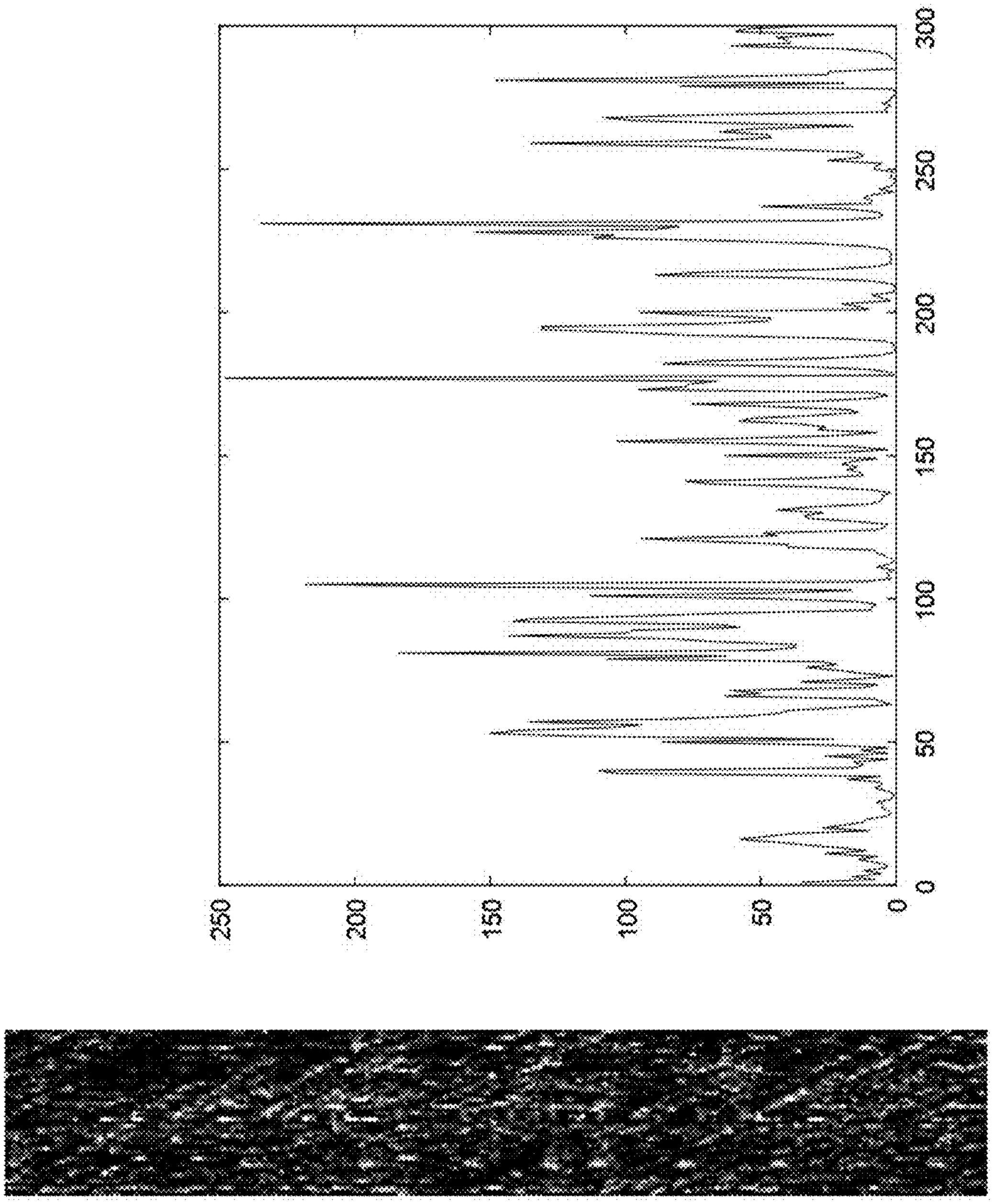

Offline flowchart of the system is as following:

Acoustic phoneme based classifier is trained. A short time window is utilized such as 1.5 seconds to detect these acoustic phonemes. Spectrograms of acoustic events are shown in FIG. 2.

Convolutional neural network is trained to detect these spectrograms. This network is denoted as phoneme classifier and is applied on each channel independently. (Results of this network is stored on image data base to be further evaluated later on.) This network is a generic one such that it classifies all possible events i.e. digging, walking, excavation, vehicle, noise.

Power-probability classifier operates on the accumulated results of this phoneme classifier probabilities along with power for certain type of event.

Synthetic activity generator is utilized to create possible event scenarios for training along with actual data.

Power-probability image is a three channel input. First channel is the normalized-quantized power input. Second channel is phoneme probability. Third channel is the cross product of power and probability. (Power, Probability, Power*Probability)

The power, probability and cross product result for a microphone array spread over 51.5 km can be found in FIG. 2. Following portion displays the last 20 km statistics. A digging activity at 46 km reveals itself at the cross product image Pow*Prob. Cross product feature is clean in terms of clutter. Feature engineering along with machine learning technique detects the digging pattern robustly.

Devised technique can be visualized as an expert trying to inspect an art-piece and detect modifications on an original painting, which deviates from the inherent scene acoustics. In FIGS. 4-7, several examples of non-activity background and actual events are provided. An event creates a perturbation of the background power-probability image. Digging timing is not in synchronous with the car passing, hence horizontal strokes fall asynchronous with diagonal lines of vehicles. Hence, network learns this periodic pattern that occurs vertically considering the power and probability of the neighbouring channels.

Figure 8:
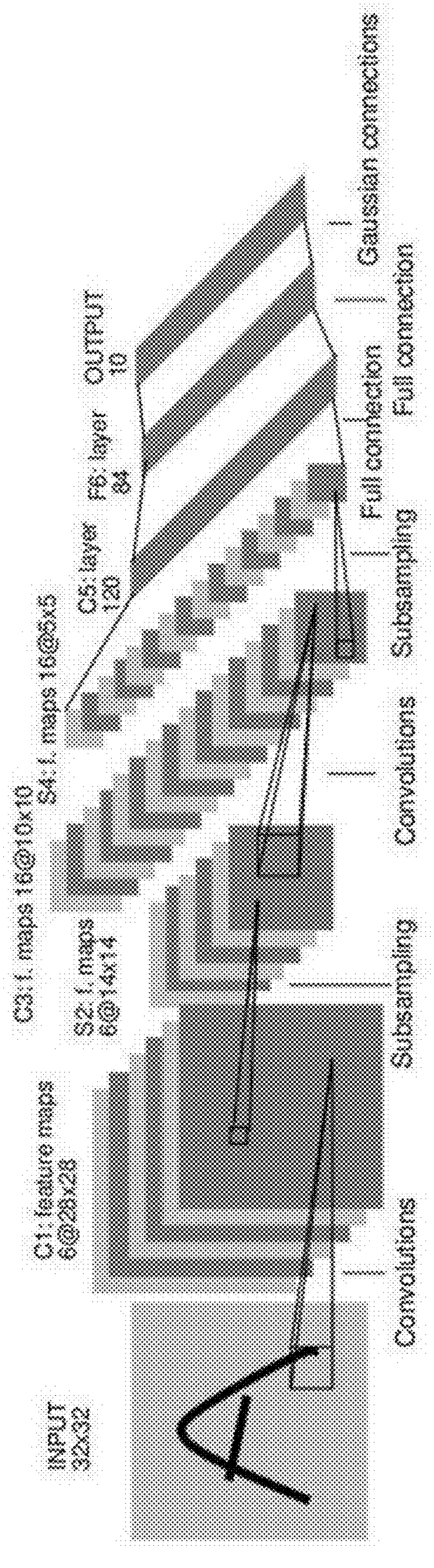
FIG. 8 shows a sample network structure.
Figure 9:
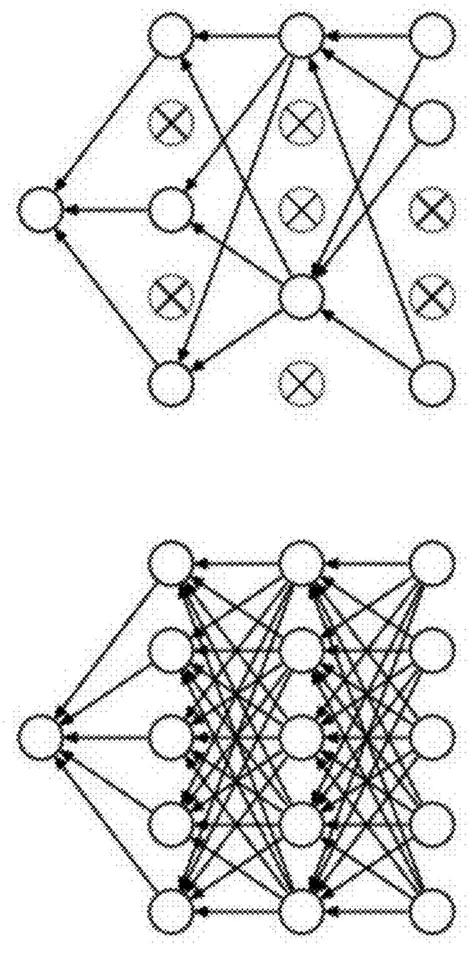
FIG. 9 shows standard neural net and after applying dropout respectively.

FIG. 8 shows a sample network structure. Dropout is used after fully connected layers in this structure. Dropout reduces overfitting so prediction being averaged over ensemble of models. FIG. 9 shows standard neural net and after applying dropout respectively.

What is claimed is:

1. A method for a multi-channel acoustic event detection and classification, comprising the following steps of:

specifying a time window from raw acoustic signals, received from a multi-channel acoustic device in a synchronized fashion and stored in channel database, computing a power of each channel of channels for a specified window size, computing a classification probability of the raw acoustic signals for the time window, computing a cross product of the power and the classification probability and storing the cross product as a third dimension of a power-probability image to enrich an information capacity, wherein a first dimension, a second dimension and the third dimension of the power-probability image are respectively the power, the classification probability and the cross product of the power and the classification the classification probability, applying a convolutional neural network trained to detect spectrograms of acoustic events, denoted as a phoneme classifier, on the each channel independently, counting high-probability events exceeding a given threshold independently for the each channel using probability information from the power-probability image to detect possible channels with the high-probability events, recording the channels having a certain number of the high-probability events, exceeding the given threshold, to an event channel stack, cropping a region of interest around every event of interest, wherein the every event of interest is determined by a user in the each channel in the event channel stack, operating a power-probability classifier on accumulated results of phoneme classifier probabilities along with the power fora certain type of event classified by the phoneme classifier, reporting an event when the power-probability classifier generates a result exceeding a threshold for the event to be declared.

2. The method according to claim 1, comprising utilizing a synthetic activity generator to create possible event scenarios for a training along with actual data.

3. The method according to claim 1, wherein the power of the each channel for the specified window size is computed by:

normalizing the power using a ratio of low-frequency components to high-frequency components, clipping the power from a top and a bottom and quantizing to a power quantization level in between, storing a quantized power in the power-probability image.

4. The method according to claim 1, wherein a machine learning technique for computing the classification probability of the raw acoustic signals for the time window is the convolutional neural network.

* * * * *